(12) United States Patent
North et al.

(10) Patent No.: US 7,603,236 B2
(45) Date of Patent: Oct. 13, 2009

(54) METHOD TO DETERMINE FLUID PHASE DISTRIBUTION AND QUANTIFY HOLDUP IN A WELLBORE

(75) Inventors: Robert James North, Livermore, CA (US); QingFeng Zhu, Beijing (CN); Gang Xu, Beijing (CN); Hui Jin, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 157 days.

(21) Appl. No.: 11/507,253

(22) Filed: Aug. 21, 2006

(65) Prior Publication Data

US 2008/0046186 A1 Feb. 21, 2008

(51) Int. Cl.
*G01V 1/40* (2006.01)
*E21B 49/00* (2006.01)

(52) U.S. Cl. ........................................ 702/6; 73/152.06

(58) Field of Classification Search ............... 702/6, 702/1, 2, 7–9, 11–13, 50, 187, 189; 367/18, 367/69; 73/152.02, 152.06, 152.08, 152.14, 73/152.18, 152.21, 125.29, 152.39, 152.42
See application file for complete search history.

(56) References Cited

U.S. PATENT DOCUMENTS

| | | | |
|---|---|---|---|
| 3,792,347 A | | 2/1974 | Hawley |
| 4,441,362 A | * | 4/1984 | Carlson ................... 73/152.31 |
| 5,095,983 A | * | 3/1992 | Magnani ................ 166/250.01 |
| 5,138,585 A | * | 8/1992 | Angehrn et al. ............... 367/86 |
| 5,361,206 A | * | 11/1994 | Tabeling et al. ............... 702/12 |
| 5,361,632 A | * | 11/1994 | Magnani .................... 73/152.14 |
| 5,531,112 A | * | 7/1996 | Young et al. ............. 73/152.02 |
| 5,551,287 A | * | 9/1996 | Maute et al. ............. 73/152.02 |
| 5,561,245 A | * | 10/1996 | Georgi et al. ............ 73/152.02 |
| 5,661,237 A | | 8/1997 | Dussen et al. |
| 5,708,203 A | * | 1/1998 | McKinley et al. ......... 73/152.14 |
| 5,831,743 A | | 11/1998 | Ramos et al. |
| 6,016,191 A | | 1/2000 | Ramos et al. |
| 6,023,340 A | | 2/2000 | Wu et al. |
| 6,028,307 A | | 2/2000 | Young et al. |
| 6,075,611 A | | 6/2000 | Dussen et al. |
| 6,496,261 B1 | | 12/2002 | Wilsher et al. |
| 6,575,043 B1 | * | 6/2003 | Huang et al. ............. 73/861.25 |
| 6,779,407 B2 | * | 8/2004 | Maute ..................... 73/861.12 |
| 6,850,317 B2 | | 2/2005 | Mullins et al. |

(Continued)

FOREIGN PATENT DOCUMENTS

WO WO 01/11190 A1 2/2001

OTHER PUBLICATIONS

Xie et al., Imaging Technologies in Oilfield Applications, 2005, Journal of Zhejang University Science 6A(12), pp. 1394-1400.*

(Continued)

*Primary Examiner*—Michael P. Nghiem
*Assistant Examiner*—Toan M Le
(74) *Attorney, Agent, or Firm*—Hoffman Warnick LLC

(57) ABSTRACT

The present invention is a method of determining fluid phase distribution and quantifying holdup in a wellbore. The method includes receiving a plurality of oriented probe data and grouping the oriented probe data based on a depth interval. The grouped probe data is processed and fluid phase distribution information is generated based on the processed result.

23 Claims, 6 Drawing Sheets

U.S. PATENT DOCUMENTS

| | | | |
|---|---|---|---|
| 6,939,717 | B2 | 9/2005 | Jiang et al. |
| 7,099,780 | B2 * | 8/2006 | Faur et al. .................. 702/45 |
| 7,328,624 | B2 * | 2/2008 | Gysling et al. ............... 73/736 |
| 2003/0029995 | A1 | 2/2003 | Mullins et al. |
| 2006/0041382 | A1 | 2/2006 | Faur et al. |

OTHER PUBLICATIONS

Baldauff et al., Profiling and Quantifying Complex Multiphase Flow, Autumn 2004, Oilfield Review, pp. 4-13.*

Hill A.D., Production Logging—Theoretical and Interpretive Elements, SPE Monograph 14, 1990.

Catala G., Theron B., Conort G., and Ferguson J., Fluid Flow Fundimentals, Oilfield Review 8, No. 4 (Winter) 1996, pp. 61-64.

Oddie G., Shi H., Durlofsky L. J., Aziz K., Pfeffer B., and Holmes J. A., Experimental Study of Two and Three Phase Flows in Large Diameter Inclined Pipes, International Journal of Multiphase Flow 29 (2003) 527-558.

Halford F. R., Mackay S., Barnett S., and Petler J. S., A Production Logging Measurement of Distributed Local Phase Holdup SPE#35556, presented at the European Production Operations Conference and Exhibition, Stavanger, Norway, Apr. 16-17, 1996.

Lenn C., Bamforth S., and Jariwala H., Flow Diagnosis in an Extended Reach Well at BP Wytch Farm Oilfield Using a New Toolstring Combination Incorporating Novel Production Logging Technology, SPE paper 36580, Presented at the SPE Annual Technical Conference, Denver, Colorado, Oct. 6-9, 1996.

Theron B., Vu-Hoang D., Rezgui F., Catala G., Mckeon D, and Silipigno L., Improved Determination of Gas Holdup Using Optical Fiber Sensors, Transactions of the 41st SPWLA Annual Logging Symposium, Dallas, Texas, Jun. 4-7, 2000, paper GG.

Chace D., Wang J., Mirzwinski R., Maxit J., and Trcka D., Applications of a New Multiple Sensor Production Logging System for Horizontal and Highly-Deviated Multiphase Producers, SPE Annual Technical Conference and Exhibition, Dallas, Texas, Oct. 1-4, 2000.

Frisch G., Perkins T., and Quirein J., Integrating Wellbore Flow Images with a Conventional Production Log Interpretation Method, SPE Annual Technical Conference and Exhibition, San Antonio, Texas, Sep.29-Oct. 2, 2002.

Baldauff J., Runge T., Cadenhead J., Faur M., Marcus R., Mas C., North R., and Oddie G., Profiling and Quantifying Complex Multiphase Flow, Oilfield Review, vol. 16, No. 3, Autumn 2004, pp. 4-13.

Emeraude—PL Interpretation, http://www.kappaeng.com/default. aspx, 1987-2006.

Plato—PL Integrpreation, http://www.ispforum.com/ Documents_New/ISP_Main.html, Aug. 15, 2006.

* cited by examiner

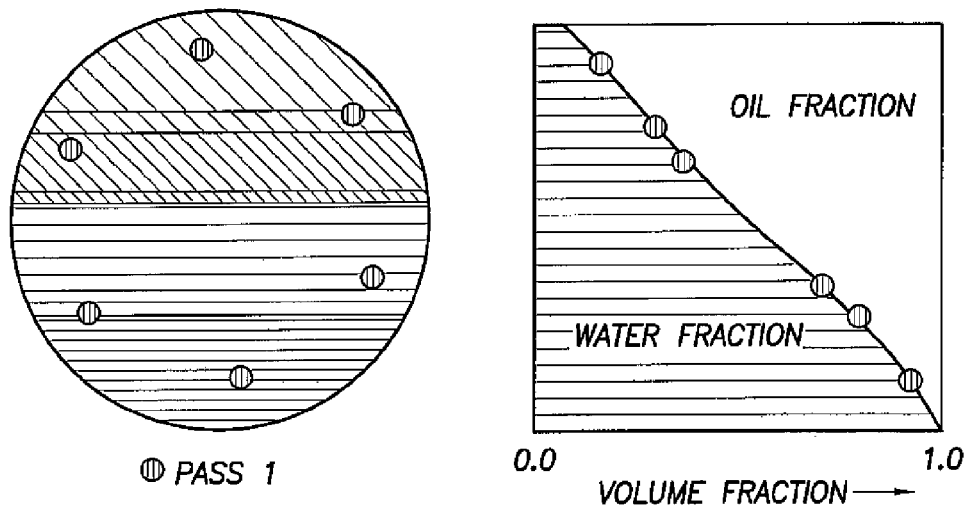
FIG.2b
FIG.2c
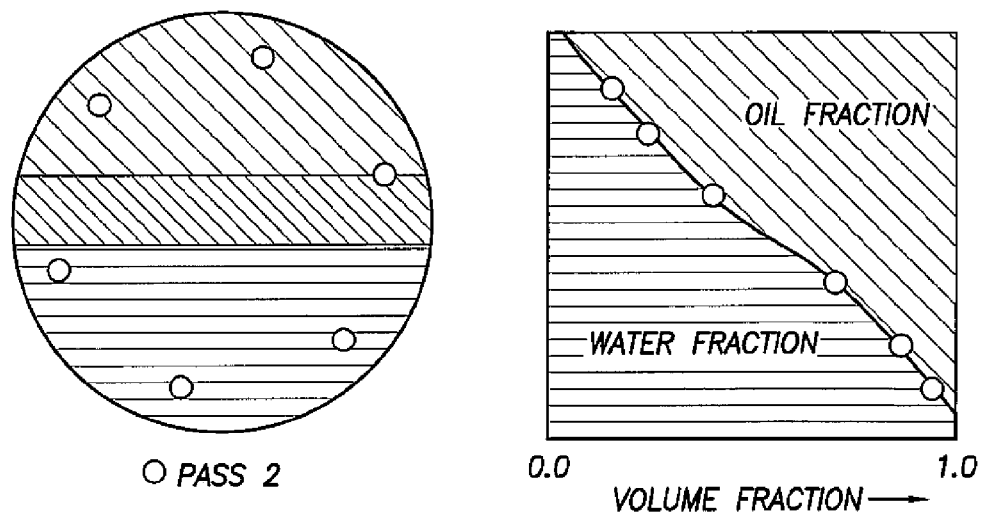

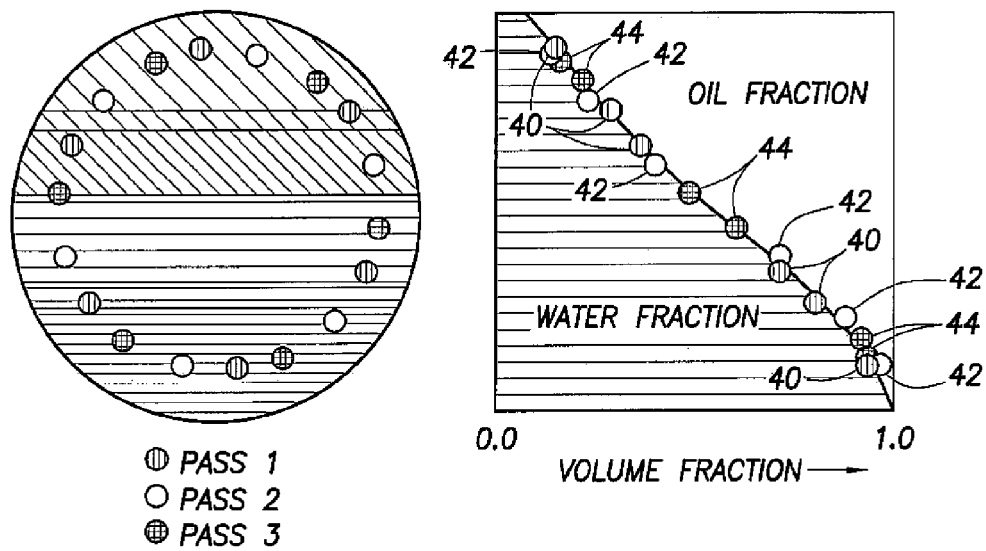
FIG.4
FIG.5
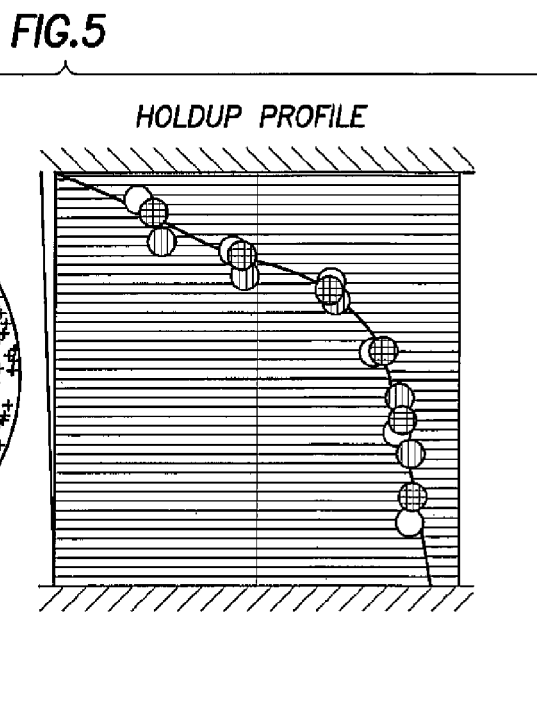

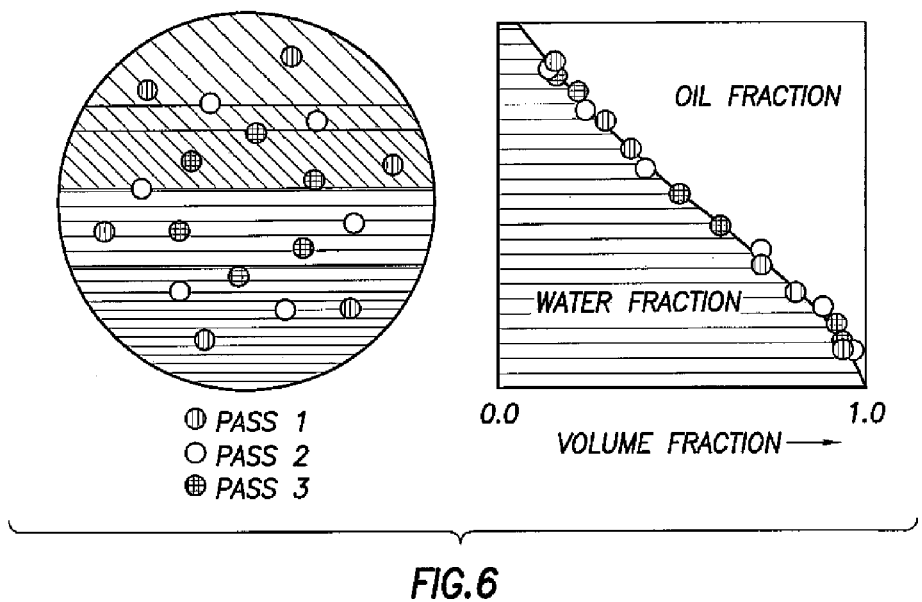
FIG.6
FIG.7
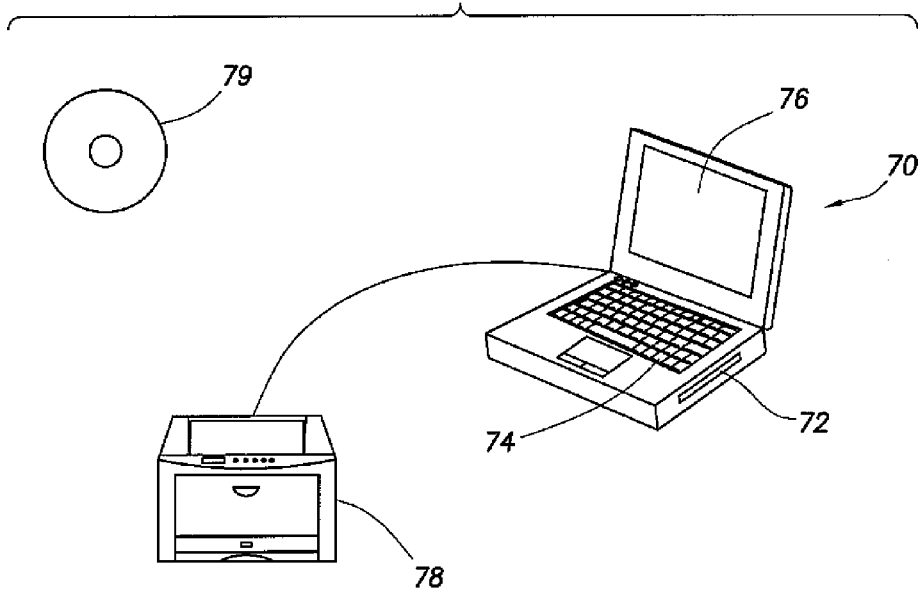

US 7,603,236 B2

METHOD TO DETERMINE FLUID PHASE DISTRIBUTION AND QUANTIFY HOLDUP IN A WELLBORE

FIELD OF THE INVENTION

The present invention generally relates to production logging measurements in a hydrocarbon producing well, and more particularly to improved methods and apparatus to determine fluid phase distribution and quantify holdup in a wellbore.

BACKGROUND OF THE INVENTION

In the production of underground petroleum products (oil and gas), it is important to determine the fractions of flow through a wellbore that are attributed to different components, that is, oil, water and gas. For example, it is known that water production often increases as oil reserves are depleted, or in response to a water injection program. When the degree of water present in the production flow becomes excessive, production logging surveys are used to determine the locations and rates of water entry into the flow regime. These surveys include both measurements of fluid velocities and attempts at determining the average fractional percentages of the well fluids at various survey depths.

Various methods have been devised to calculate the fractional percentages, or "holdups," of a phase component in the fluid flow. At a particular depth, the holdup of a specified phase (gas, oil, or water) is defined as the fraction of the cross sectional area of the casing or tubing that is occupied by that phase. The traditional holdup logging devices are the radioactive fluid-density (gamma-gamma attenuation) and the water-holdup (capacitance, or dielectric) tools. In addition, it is known to use a gradiomanometer, a device which measures pressure gradient over a given height, which gradient may be considered as being a function solely of the difference in level between the two measurement points and of the apparent density of the fluid. Given the respective densities of the various phases, it is then possible to calculate the various proportions thereof. Another approach consists in taking measurements by means of local sensors that produce signals having different levels depending on which phase is in contact with the sensor. U.S. Pat. No. 3,792,347 (Hawley) thus proposes an electrical type measurement by measuring resistivity. U.S. Pat. No. 6,023,340 (Wu et al.) proposes a fiber optic type measurement by measuring optical reflectance.

Recent devices derive the wellbore cross-sectional averaged volumetric flow rate and holdup from a number of oriented local measurements made within the wellbore. The principal devices for measuring flow rates employ propellers or turbines which are assumed to measure the average volumetric flow rate of the entire fluid mixture. In the process of the flow rate determination, logging measurements are used to calculate the holdup occupied by each of the flowing fluids. The spatial distribution of the fluids in the wellbore can also be used to aid in this determination. Sensors (for example local probes and mini-spinners) located on various known points of the cross section of the well are used as stated in the document WO 01/11190. Local probe measurements provide a means to evaluate this spatial distribution and holdup. A method for calculating the relative volumetric flow rates of at least one of the phases of a multiphase effluent flowing in a well is known as stated in US Patent pplication 20060041382. However, the dynamic nature of downhole flow leads to variations and local, temporary anomalies in the flow structure so that they are not representative of the overall flow behavior.

Therefore, the interpretation of these data, collected at each local spinner and probe in order to calculate relative volumetric flow rates at all depths, is thus becoming a very important procedure in order to estimate the behavior of each fluid constituting the well effluent.

SUMMARY OF THE INVENTION

One aspect of the invention is directed to a method of determining fluid phase distribution. The method comprises receiving a plurality of oriented probe data; grouping the oriented probe data based on a depth interval; processing the grouped probe data; and generating fluid phase distribution information based on the processed result.

Embodiments of the method may further include merging the grouped probe data at the depth interval. The method may further comprise combining oriented holdup values of the grouped probe data to form a single array of oriented holdup values at each depth. The method may further comprise selecting a model through the merged probe data.

Additional objects and advantages of the invention will become apparent to those skilled in the art upon reference to the detailed description taken in conjunction with the provided figures.

BRIEF DESCRIPTION OF THE DRAWINGS

The present invention is illustrated by way of example and not intended to be limited by the figures of the accompanying drawings in which like references indicate similar elements and in which:

FIGS. 2(a)-2(d) include a flowchart and a few examples showing steps associated with multi-pass probe processing;

FIGS. 4-6 are graphical depictions and examples illustrating several embodiments of applying the present invention; and FIG. 7 is a schematic illustration of computer hardware associated with the apparatus and article of manufacture.

DETAILED DESCRIPTION OF THE INVENTION

Figure 1A:
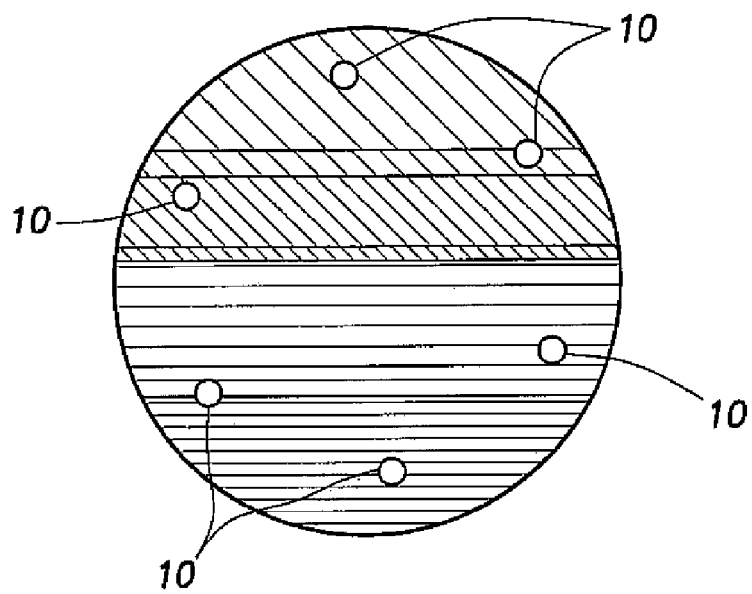
FIGS. 1(a) and 1(b) are graphical depictions illustrating one embodiment of the mapping fluid distributions process related to the present invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As it has already been explained by the applicants in WO 01/11190, in order to identify the volumetric fractions of the fluids of a multiphase effluent, at a given depth of the well, and the relative volumetric flow rates of said fluids, one needs to determine the local volumetric fractions (usually called holdup) of each fluid (typically oil, water and gas), and the local velocity of each of these. Many holdup measurement devices are designed to determine a global, cross-sectional averaged answer. Others are capable of making local measurements at the specific location of the sensors or probes. These local probe measurements are combined with tool orientation data allowing the position of the sensors in the flow stream to be determined. Knowing local values of holdup at different positions in the flow stream can provide a map of the phase distribution and help quantify phase holdups. As more positions are measured, more detail is added to the phase distribution, and more exact holdups are determined.

Figure 1B:
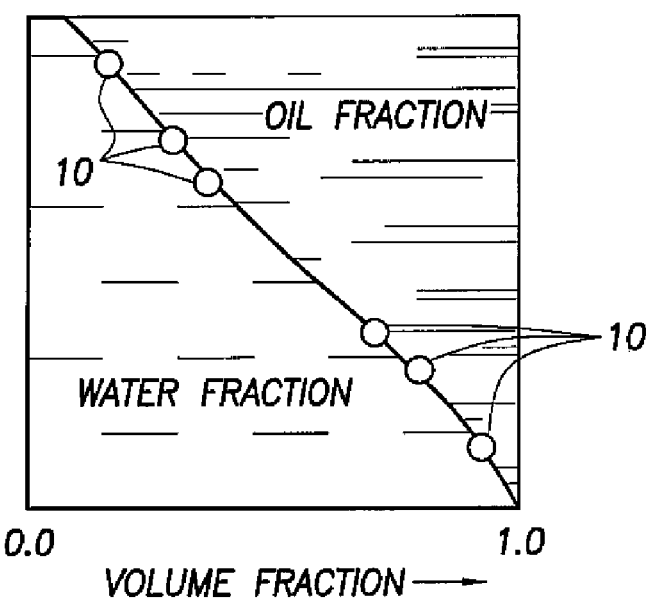

FIGS. 1(a) and 1(b) are graphical depiction of one embodiment of the process of mapping fluid distributions from oriented probe data to determine fluid volume fractions in a two-phase situation. Referring to FIG. 1(a), a cross section of the wellbore normal to the flow direction is shown. In one embodiment as example purpose, the positions of the local probes are depicted as dots 10 with six probes in this case. Of course, any number of oriented probes could be used. Corresponding to FIG. 1(a), FIG. 1(b) shows a cube of unit volume with the individual probe volume fraction values plotted along the x-axis versus the vertical probe positions on the y-axis. A line through the probe values divides the unit volume into the individual phase fractions. A variety of line fitting models may be used in the volume fraction determination. For example, the line fitting model can be a linear model using straight line segments fit through pairs or groups of points. In another embodiment, the line fitting model can be a curve fit model using best fit curve shapes through groups of points. Still in another embodiment, the line fitting model can be a flow model that defines various curve shapes to be fit to the available points depending on given flow parameters. In fact, any kind of line fitting model can be used in the volume fraction determination. In one embodiment for illustrative purposes as shown in FIG. 1(b), the phase mixtures are combinations of oil and water. In practice, the phase mixtures can be any combinations of oil, water, and gas; or pure oil, water, or gas; or any combinations with other kind of material.

Figure 2A:
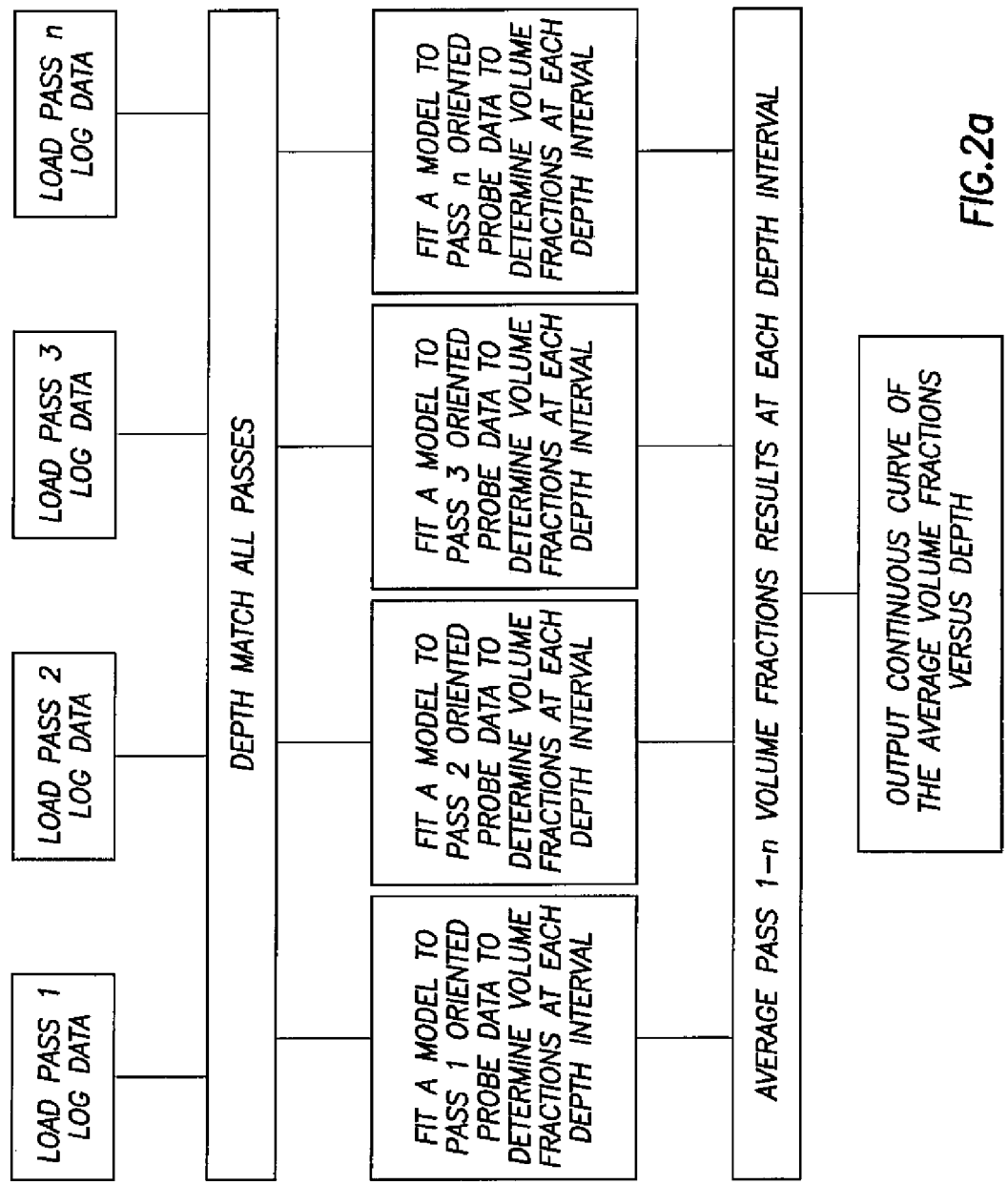
Figure 2D:
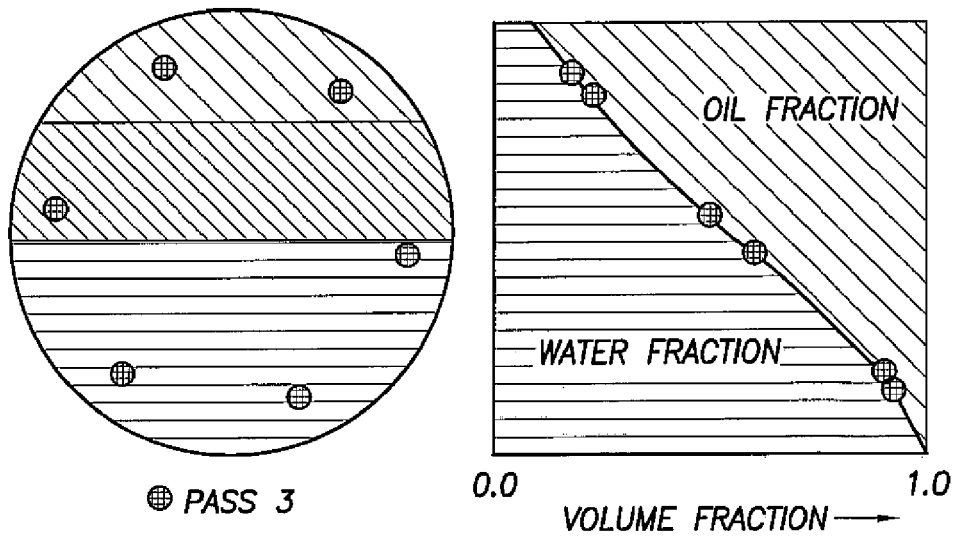

Production logging data acquisition commonly includes multiple passes of sensor measurements across the interval(s) of interest. Multiple passes are required for in-situ flowmeter calibrations and also provide valuable repeat passes of the other sensors data. Because the dynamic nature of downhole flow leads to variations and local, temporary anomalies in the flow structure, one pass of sensor measurements cannot represent the overall flow behavior. Currently oriented local probe measurements are processed on a pass-by-pass basis to determine individual pass phase distributions and holdups. As such, the acquisitions of multiple passes of sensor data over the intervals of interest are used to average out variations and eliminate temporary anomalies from the analysis, and the results of the individual pass answers are then averaged to give a multi-pass result, as illustrated in FIGS. 2(a)-2(d). Specifically, FIG. 2(a) illustrates a flowchart of such process. FIGS. 2(b)-2(d) each can determine volume fractions at one depth interval for individual pass, and the final result would be the average result of FIGS. 2(b)-2(d).

Figure 3:
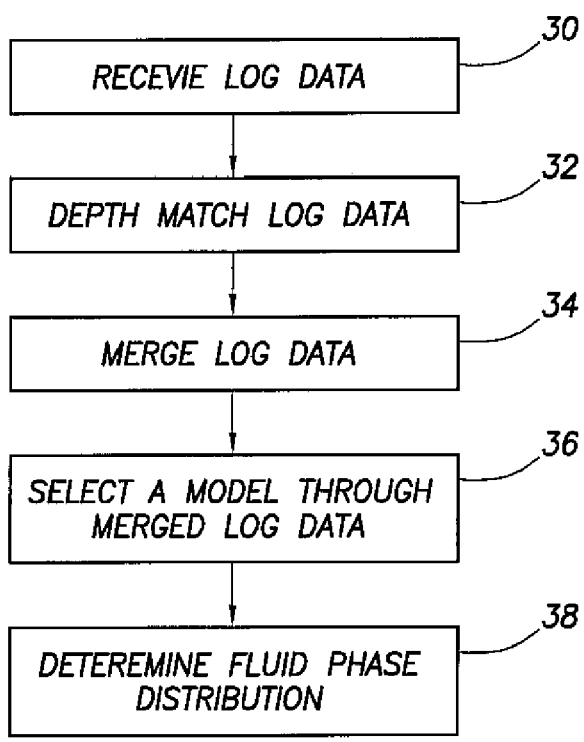
FIG. 3 is a flowchart showing steps associated with the present method, apparatus, and article of manufacture.

The method of the invention has thus been developed to combine multiple passes of local probe data to more exactly determine the phase distributions and holdups. Now referring to FIG. 3, it shows several steps associated with the present method, apparatus and article of manufacture and provides a general overview of the invention. In the Receive Log Data Step 30, multiple passes of oriented local probe data are received. In one embodiment, the local probe data can be acquired from a variety of production logging tools which record the downhole measurements versus depth as the tools move through the wellbore. In another embodiment, the local probe data are received directly from downhole production logging tools via cable connection during acquisition. Still in another embodiment, the local probe data could be received via real-time data transmission from a wellsite through web based links. Still in another embodiment, the local probe data can be loaded from physical recordings of the log data on digital media.

The probe data are then grouped based on a depth interval and orientation. In the Depth Match Log Data Step 32, the loaded data for each pass is inspected for depth consistency and shifted if needed to put each pass on a common depth reference. Depth shifting practices and procedures are common to the art of well log interpretation and would be well understood by those skilled in the art. In the Merge Log Data Step 34, the oriented holdup values for all available probes on all available passes are combined together at each depth interval to form a single array of oriented holdup values at each depth. Common depth intervals for well log data acquisition typically range from 0.1 inch to 0.5 feet, although any depth interval could be used.

After the Merge Log Data Step 34, the Select a Model Through the Merged Log Data 36 can determine the volume fractions at each depth interval. A variety of line fitting models may be used in the volume fraction determination. For example, the line fitting model can be a linear model using straight line segments fit through pairs or groups of points. In another embodiment, the line fitting model can be a curve fit model using best fit curve shapes through groups of points. Still in another embodiment, the line fitting model can be a flow model that defines various curve shapes to be fit to the available points depending on given flow parameters. In fact, any kind of line fitting model can be used in the volume fraction determination. Specifically, the model can be the same one or different one at each depth interval. Finally, in the Determine Fluid Phase Distribution Step 38, after combination of the results from the multiple depth intervals, a continuous curve of the merged volume fractions versus depth can provide the volume fractions at any depth. The output volume fraction versus depth curve can be output as a digital file on any electronic media and also as a graphic plot, commonly known in the industry as a log, showing volume fraction versus depth.

We now provide some examples which illustrate and yield further insights into this invention. FIG. 4 depict three passes of radially distributed local probe data across a given depth interval with varying probe positions due to changes in the rotational orientation of the sensors for each pass. Instead of averaging the individual volume fraction result, the inventive method combines the individual oriented local probe measurements from all the available passes first and then uses the combined pass probe data to determine the phase distributions and holdups. Specifically, one pass can provide six oriented local probe measurements thus three pass can provide eighteen oriented local probe measurements (dots 40, 42 and 44) totally. Since three times of oriented local probe measurements are received for analysis comparing with FIG. 2(b) or FIG. 2(c) or FIG. 2(d), the inventive method can provide a more robust and accurate measurement of the downhole phase distribution and the final holdup answer. Of course, each pass can provide any number of local probe measurements, and practically any number of passes can be used. It shall be noted that the more passes provided, the more accurate result can be given by using the inventive method comparing with each individual result as illustrated in FIG. 2(b) or FIG. 2(c) or FIG. 2(d).

In another embodiment, FIG. 5 shows three passes of local probe data for a tool with a linear distribution of sensors with varying probe positions due to changes in the rotational orientation of the sensors for each pass. Still in another embodiment, in addition to using the rotational aspect of tool and probe positions, FIG. 6 shows the probe positions can also be changed by physically adjusting the sensor radial distribution. Similar to FIG. 4, by applying the inventive method, more robust and accurate measurement of the downhole phase distribution and the final holdup answer can be provided as illustrated in FIGS. 5 and 6.

FIG. 7 schematically illustrates computer hardware that may be used to implement the inventive method. Computer 70 has a media reading device, such as a CD-ROM Reader 72, a floppy disk device, or a ZIP drive. The media reading device may also be capable of recording the output of the program the computer 70 is running. A user of the computer 70 may enter commands using a user input device, such as a keyboard 74 or a mouse, may view output of the program code on a visual display device, such as monitor 76, and may make hardcopies of output using an output device, such as printer 78. When properly configured, computer 70 (and its associated peripheral devices) is an apparatus for outputting measurement of the downhole phase distribution and the final holdup answer in accordance with the present invention. Computer media, such as a CD-ROM 79, a floppy disk, or a ZIP disk, may have computer readable program code that allows the computer 70 to output measurement of the downhole phase distribution and the final holdup answer in accordance with the inventive method.

Therefore, an embodiment of the inventive method is disclosed. The inventive method uses multiple passes of production logging oriented, local probe measurements to improve the determination of the fluid distributions and fractional flow areas. The inventive method combines the oriented sensor data from all the passes together and then evaluates the combined sensor response for the final answer thus provides a more robust and accurate measurement of the downhole phase distribution and the final holdup answer.

The inventive method can be applied to any type of local probe volume fraction measurements that provide variable probe orientations from pass to pass, it can also be applied to other locally measured production logging attributes, such as local spinner measurements used to map the velocity distribution across the wellbore.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

We claim:

1. A method of determining down hole fluid phase distribution by using local probes in multiple passes through the borehole, comprising:
a computer configured to perform the following:
receiving a plurality of oriented probe data from multiple passes of local probes;
grouping said oriented probe data based on a depth interval;
forming an array of oriented holdup values at each depth with the grouped probe data, wherein the array of oriented holdup values comprises multiple holdup values of each fluid phase derived from multiple passes of local probes;
determining volume fraction at each depth by applying fraction models to the array of oriented holdup values at the depth; and
generating fluid phase distribution.

2. The method of claim 1, wherein grouping said probe data comprises inspecting and shifting said probe data for depth consistency.

3. The method of claim 1, wherein processing the grouped probe data comprises merging said grouped probe data at said depth interval.

4. The method of claim 3, wherein processing grouped probe data further comprises selecting a model through said merged probe data.

5. The method of claim 3, wherein processing grouped probe data further comprises selecting a linear model using straight line segments fit through groups of points.

6. The method of claim 3, wherein processing grouped probe data further comprises selecting a curve fit model using best fit curve shapes through groups of points.

7. The method of claim 3, wherein processing grouped probe data further comprises selecting a flow model that defines various curve shapes to be fit to the available points depending on given flow parameters.

8. The method of claim 1, wherein processing the grouped probe data comprises combining oriented holdup values of said grouped probe data to form a single array of oriented holdup values at each depth.

9. The method of claim 1, wherein processing grouped probe data determines fluid phase volume fractions at each said depth interval.

10. The method of claim 1, wherein generating fluid phase distribution information comprises outputting information of volume fractions versus depth.

11. The method of claim 1, wherein generating fluid phase distribution information comprises outputting volume fractions versus depth curve as a digital file on electronic media.

12. The method of claim 1, wherein generating fluid phase distribution information comprises outputting volume fractions versus depth curve as a log.

13. The method of claim 1, wherein said oriented probe data are acquired from a variety of production logging tools.

14. The method of claim 1, wherein said oriented probe data are acquired from downhole production logging tools via cable connection.

15. The method of claim 1, wherein said oriented probe data are acquired from a wellsite through web based links via real-time data transmission.

16. The method of claim 1, wherein said oriented probe data are acquired from physical recordings of log data on digital media.

17. The method of claim 1, wherein said oriented probe data are local spinner measurement data used to map velocity distribution.

18. The method of claim 1, wherein said depth interval ranges from 0.1 inch to 0.5 feet.

19. An apparatus for determining down hole fluid phase distribution by using local probes in multiple passes through the borehole, comprising:
means for receiving a plurality of oriented probe data from multiple passes of local probes;
means for grouping said oriented probe data based on a depth interval;
means for forming an array of oriented holdup values at each depth with the grouped probe data, wherein the array of oriented holdup values comprises multiple holdup values of each fluid phase derived from multiple passes of local probes;
means for determining volume fraction at each depth by applying fraction models to the array of oriented holdup values at the depth; and
means for generating fluid phase distribution.

20. The apparatus of claim 19 further comprising means for merging said oriented probe data at said depth interval.

21. The apparatus of claim 20 further comprising means for selecting a model through said merged probe data.

22. The apparatus of claim 19 further comprising means for outputting information of volume fractions versus depth.

23. An article of manufacture, comprising:
  computer readable program code stored on a computer recordable medium for determining down hole fluid phase distribution by using local probes in multiple passes through the borehole, the computer readable program code comprising:
  program code for receiving a plurality of oriented probe data from multiple passes of local probes;
  program code for grouping said oriented probe data based on a depth interval;
  program code for forming an array of oriented holdup values at each depth with the grouped probe data, wherein the array of oriented holdup values comprises multiple holdup values of each fluid phase derived from multiple passes of local probes;
  program code for determining volume fraction at each depth by applying fraction models to the array of oriented holdup values at the depth; and
  program code for generating fluid phase distribution.

* * * * *